US012778106B2

(12) United States Patent
Pleines et al.

(10) Patent No.: US 12,778,106 B2
(45) Date of Patent: Nov. 3, 2026

(54) FARMING MACHINES CONFIGURED TO TREAT PLANTS WITH A COMBINATION OF TREATMENT MECHANISMS

(71) Applicant: Deere & Company, Moline, IL (US)

(72) Inventors: Stephan Pleines, Sunnyvale, CA (US); William Louis Patzoldt, Gilroy, CA (US); Austin Schuh, Sunnyvale, CA (US); Jacob Goldstein, Sunnyvale, CA (US); Filip R. Reese, Sunnyvale, CA (US); Matthew Potter, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 8 days.

(21) Appl. No.: 17/985,761

(22) Filed: Nov. 11, 2022

(65) Prior Publication Data

US 2023/0276783 A1 Sep. 7, 2023

Related U.S. Application Data

(60) Provisional application No. 63/316,269, filed on Mar. 3, 2022.

(51) Int. Cl.
*A01M 7/00* (2006.01)
*G05B 13/02* (2006.01)

(52) U.S. Cl.
CPC ....... *A01M 7/0092* (2013.01); *G05B 13/0265* (2013.01)

(58) Field of Classification Search
CPC ... A01C 21/007; A01C 23/005; A01C 23/028; A01G 7/06; A01G 25/00; A01G 25/09; A01G 13/06; A01G 13/065; A01G 5/00; A01M 7/005; A01M 7/0014; A01M 7/0042
USPC .................... 111/127; 47/1.5, 1.01, 1.7, 57.7
See application file for complete search history.

(56) References Cited

U.S. PATENT DOCUMENTS

| | | | | |
|---|---|---|---|---|
| 10,713,484 | B2 * | 7/2020 | Polzounov | A01M 7/0089 |
| 11,076,589 | B1 * | 8/2021 | Sibley | A01M 7/0089 |
| 11,367,207 | B2 * | 6/2022 | Fu | A01G 25/09 |
| 11,580,718 | B2 * | 2/2023 | Padwick | G06T 7/11 |
| 11,951,570 | B2 * | 4/2024 | Sibley | A01M 21/046 |

(Continued)

FOREIGN PATENT DOCUMENTS

| | | | | |
|---|---|---|---|---|
| CN | 107430715 A | * 12/2017 | | G05B 13/026 |
| EP | 3884775 A1 | * 9/2021 | | A01M 7/00 |

(Continued)

OTHER PUBLICATIONS

European Patent Office, Extended European Search Report and Written Opinion, European Patent Application No. 23156568.0, Jul. 20, 2023, 4 pages.

*Primary Examiner* — Kimberly S Berona
*Assistant Examiner* — Kevin M Dennis
(74) *Attorney, Agent, or Firm* — Fenwick & West LLP

(57) ABSTRACT

A farming machine is configured to identify a plant from a captured image and select two or more treatment mechanisms to treat the plant. To do so, the farming machine identifies characteristics of the plant, determines a treatment for the plant, and determines the available treatment mechanisms. The farming machine determines which combination of treatment mechanisms will apply the determined treatment to the plant and actuates that combination of treatment mechanisms.

17 Claims, 12 Drawing Sheets

(56) References Cited

U.S. PATENT DOCUMENTS

| | | | | | |
|---|---|---|---|---|---|
| 11,983,934 | B2 * | 5/2024 | Agrawal | G06V 20/58 | |
| 2015/0027043 | A1 * | 1/2015 | Redden | A01M 21/043 | 47/58.1 R |
| 2015/0027044 | A1 * | 1/2015 | Redden | A01M 21/043 | 47/58.1 R |
| 2019/0387687 | A1 * | 12/2019 | Nitsch | G06T 7/0012 | |
| 2020/0023398 | A1 * | 1/2020 | Feldhaus | B05B 13/005 | |
| 2021/0056338 | A1 * | 2/2021 | Padwick | G06V 20/38 | |
| 2021/0090274 | A1 * | 3/2021 | Fu | A01M 7/0042 | |
| 2022/0117215 | A1 * | 4/2022 | Sibley | A01M 21/00 | |
| 2022/0167546 | A1 * | 6/2022 | Tempel | A01C 21/007 | |
| 2023/0165234 | A1 * | 6/2023 | Anderson | G05D 1/0219 | 239/1 |
| 2023/0200288 | A1 * | 6/2023 | Janssen | A01B 79/005 | 701/50 |
| 2023/0292737 | A1 * | 9/2023 | Thompson | G06Q 50/02 | 47/1.7 |

FOREIGN PATENT DOCUMENTS

| | | | |
|---|---|---|---|
| WO | WO 99/17606 | A1 | 4/1999 |
| WO | WO 2021/062247 | A1 | 4/2021 |
| WO | WO 2021/213588 | A1 | 10/2021 |

* cited by examiner

FARMING MACHINES CONFIGURED TO TREAT PLANTS WITH A COMBINATION OF TREATMENT MECHANISMS

CROSS-REFERENCE TO RELATED APPLICATIONS FIELD

This application claims the benefit of priority to U.S. Provisional Application No. 63/316,269, filed Mar. 3, 2022, the disclosure of which is hereby incorporated by reference in its entirety.

BACKGROUND

Field of Disclosure

This disclosure relates generally to treating plants with farming machines, and more specifically to treating plants with farming machines using a combination of treatment mechanisms.

Description of the Related Art

Farming machines can be used to treat plants in a field. A field can include crops, as well as a number of undesirable plants, such as weeds. Conventional farming machines treat all plants similarly, regardless of the plants' type, growth conditions, and desirability. This often results in increased field maintenance and plant treatment costs. Therefore, to improve the efficiency and cost savings of farming methods, there is a need to treat plants differently based on their type, growth, and desirability.

SUMMARY

A farming machine is configured to treat a plant in a field. A farming machine includes a plurality of treatment mechanisms. Treating a plant includes, for example, applying fertilizer, herbicide, pesticide, and so on. The farming machine identifies characteristics of the plant in the field using an image of the plant captured by a detection mechanism, such as a camera. Based on the identified characteristics, the farming machine determines an appropriate treatment for the plant, including an area and density of treatment. The farming machine accesses treatment characteristics for each treatment mechanism, including a mechanism pattern and a mechanism density. Based on the accessed treatment characteristics, the farming machine determines two or more treatment mechanisms that, in combination, apply the determined treatment to the plant. The farming machine actuates the two or more treatment mechanisms to apply the determined treatment to the plant.

Figure 1A:
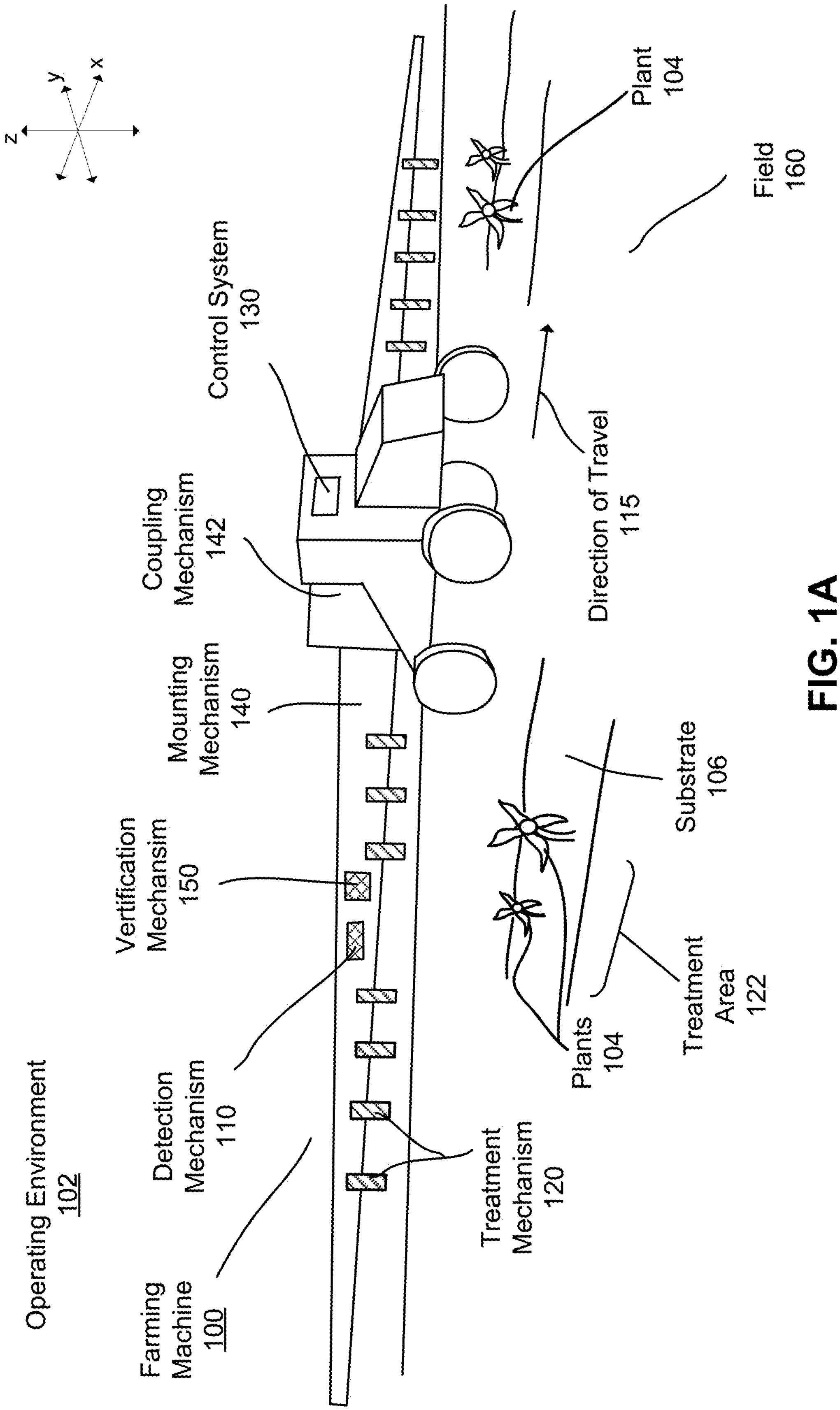
FIG. 1A is an isometric view of a farming machine that performs farming actions of a treatment plan, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Agronomists may use farming machines to treat plants in a field. The farming machines are equipped with treatment mechanisms to apply treatments to the plants. Treatments include, for example, growth regulators (e.g., pesticide, insecticide, herbicide, etc.) or promoters (e.g., fertilizers) to the plants. Fields often contain more than one crop, as well as undesirable plants, like weeds, each of which may require different types of treatment.

Conventional techniques treat all plants in the field similarly, regardless of each plant's type, desirability, and growth condition. However, treatment designated for one type of plant may not suit another. For example, crops may be able to tolerate only a limited amount of herbicide, whereas an agronomist may desire to limit the amount of fertilizer applied to a weed. In addition, weeds can sit adjacent to or under canopies of desired plants, making it challenging for the farming machine to apply herbicide without affecting desired plants.

The methods presented herein describe a farming machine configured to select treatment for identified plants in a field. The farming machine captures an image of a plant in the field, identifies characteristics of the plant, and determines an appropriate treatment for the plant. The determined treatment includes a treatment type, treatment area, and treatment density. The farming machine includes a number of treatment mechanisms, such as nozzles, each of a different size and shape that corresponds to a different spray pattern. A machine-learned model determines two or more treatment mechanisms that, in combination, will apply the determined treatment to the identified plant. The farming machine applies the treatment to the plant using the determined treatment mechanisms. Using existing treatment mechanisms within the farming machine to apply custom treatments to each plant on the field, the methods claimed herein result in more cost and time effective management of the field.

II. Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promoters, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Farming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants, watering the plants, weeding the field, harvesting the plants, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the farming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to an entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
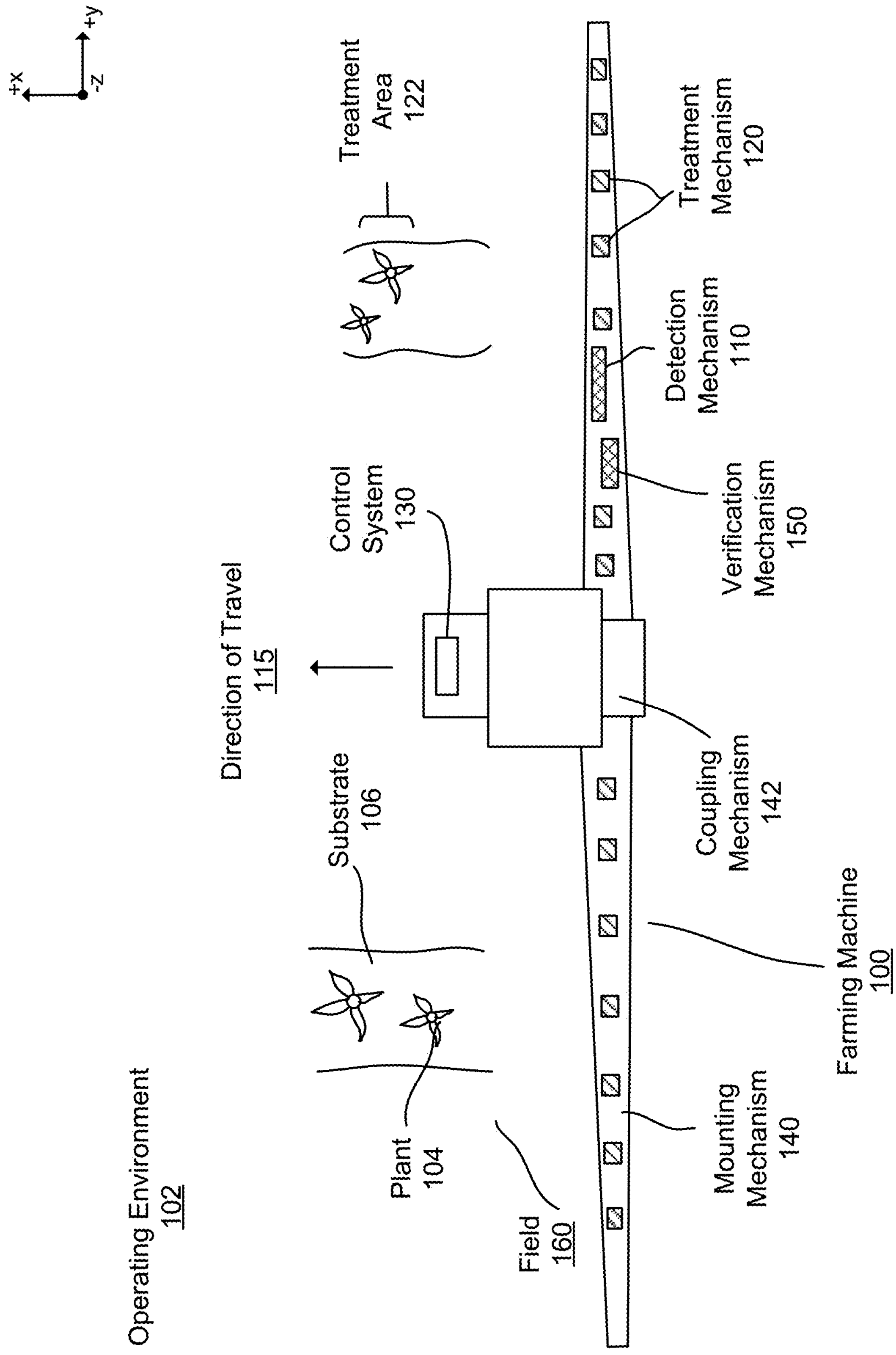
FIG. 1B is a top view of the farming machine, according to one example embodiment.
Figure 1C:
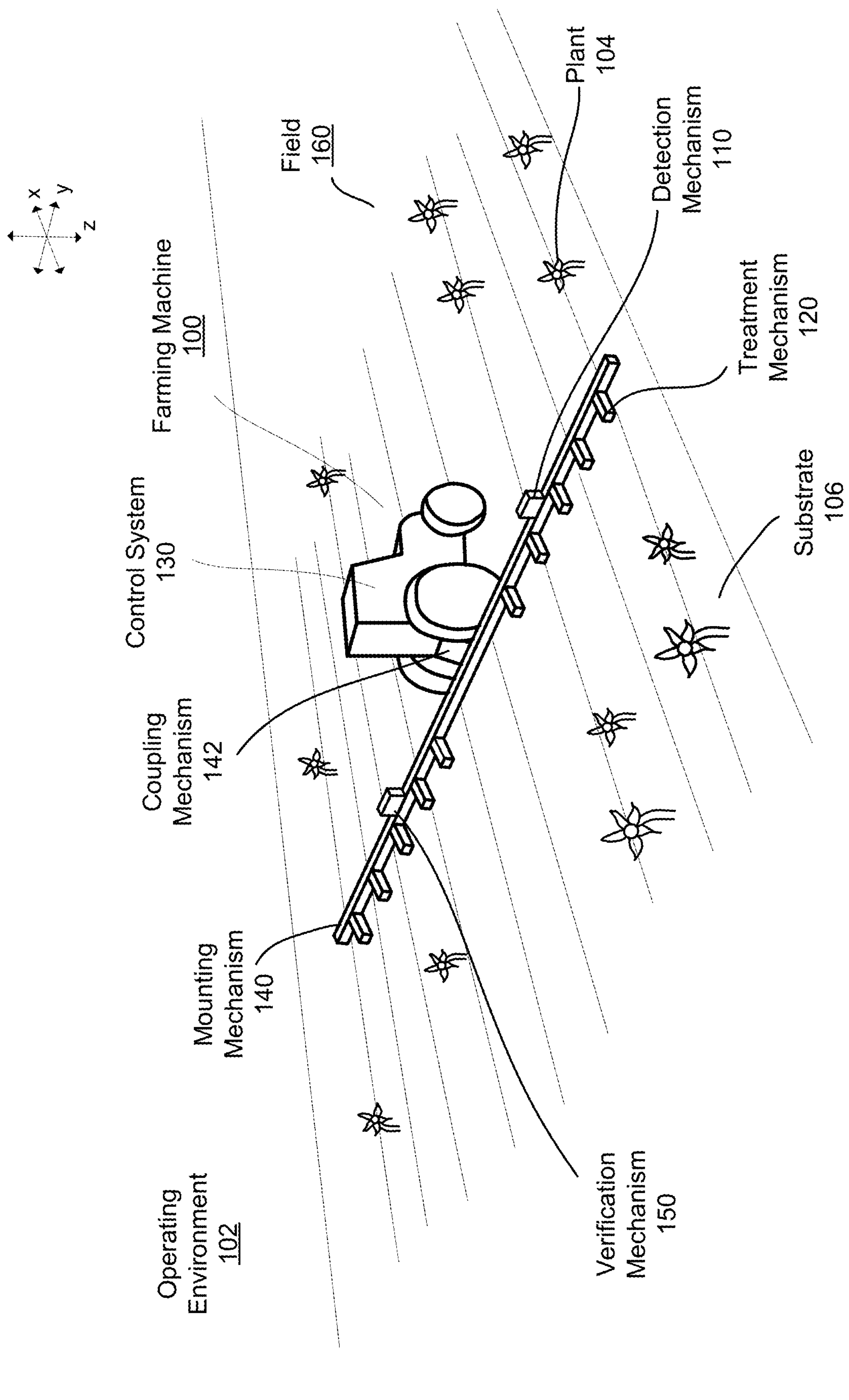
FIG. 1C is an isometric view of another farming machine that performs farming actions of a treatment plan, according to one example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, according to one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant identification module to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another example, the detection mechanism 110 is positioned to the mounting mechanism 140 such that the two traverse over a geographic location at substantially the same time as the farming machine 100 moves through the field. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may be movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured to input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification model to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100. Additionally, the mounting mechanism 140 may be utilized for removably coupling various components of the farming machine 100. For example, the mounting mechanism 140 may be used to removably couple a detection mechanism from the farming machine.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

Figure 2:
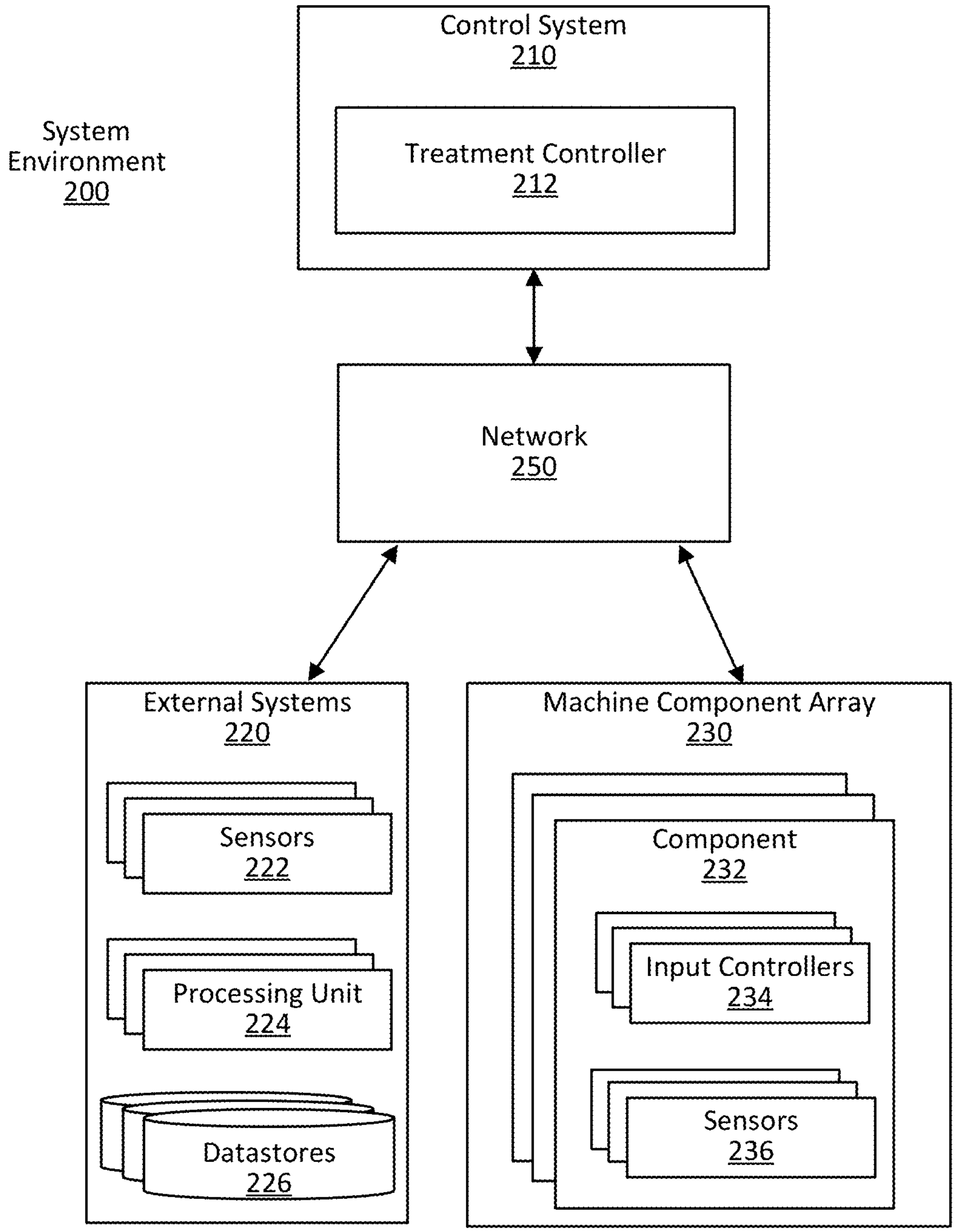
FIG. 2 is a block diagram of the system environment for the farming machine, according to one example embodiment.

FIG. 2 is a block diagram of the system environment for the farming machine 100, in accordance with one or more example embodiments. In this example, a control system 210 (e.g., control system 130) is connected to external systems 220 and a machine component array 230 via a network 240 within the system environment 200.

The external systems 220 are any system that can generate data used to selecting treatments for plants 104 based on their identification. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in selecting treatments for plants 104. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in selecting treatments for plants 104 in the field 160. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific farming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 210 receives information from external systems 220 and the machine component array 220 and implements a treatment plan in the field 160 with the farming machine 100. In particular, the control system 210 employs a treatment controller 212 to select and actuate nozzles that in combination, apply treatment to a particular plant. The treatment controller 212 is described in greater detail with respect to FIG. 4.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 210. The control system 210 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Example Fluidics System

Figure 3:
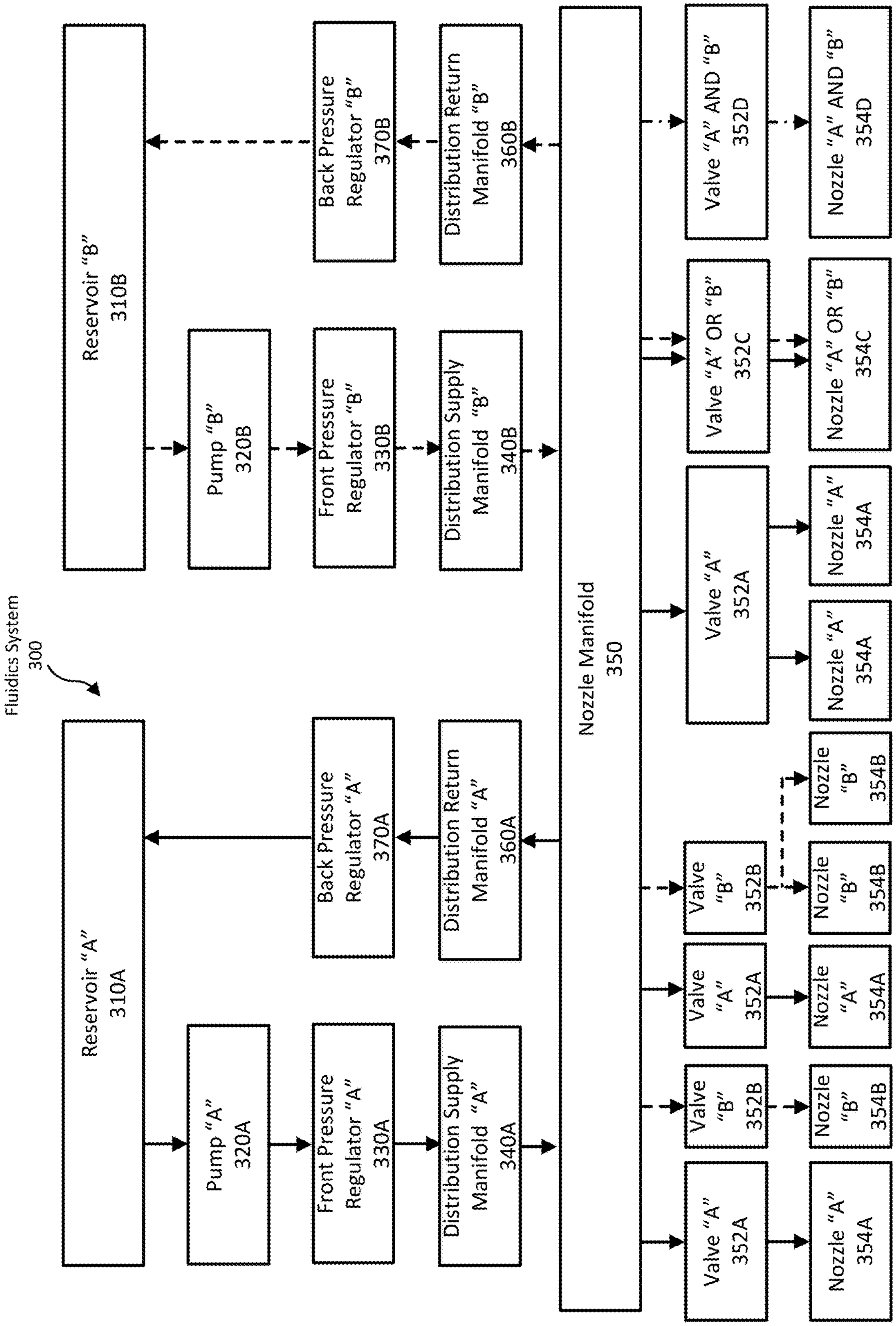
FIG. 3 is a block diagram of a fluidics system of the farming machine, according to one example embodiment.

FIG. 3 is a block diagram of a fluidics system 300 of the farming machine 100, according to one example embodiment.

As illustrated, the fluidics system 300 includes components labeled "A" and components labeled "B". In effect, the "A" and "B" systems represent two different types of treatment that can be used to treat identified plants. For example, the "A" system may be configured to treat identified plants with a growth regulator, while the "B" system may be configured to treat plants with a growth promoter, or both "A" and "B" could be a growth promoter or regulator. As another example, the "A" system may be configured to treat plants using broadcast spray methodologies, while the "B" system may be configured to treat plants using localized "see and spray" methodologies. Of course, other examples of "A" and "B" dualities are also possible, some of which are described herein below. Generally, a farming machine 100 may be configured with any "A" and "B" modalities suitable for implementing a farming objective, treatment plan, or farming action desired by a manager.

The fluidics system 300 includes a reservoir 310, a pump 320, a front pressure regulator 330, high dynamic range back pressure regulator 370, a distribution supply manifold 340, a distribution return manifold 360, nozzle manifolds 350, valve assemblies 352, and nozzles 354. Additionally, the fluidics system 300 may include additional or fewer components than those illustrated here. Moreover, the functionality of the components described may be incorporated into other aspects of the farming machine. For instance, in some examples, the fluidics system 300 may not include a distribution return manifold and/or a back pressure regulator. So, in some examples, the nozzle manifold may not have a backwards connection to the reservoir, or the backwards connection may include different components.

As illustrated, components of the fluidic system 300 labeled with "A" are configured to treat identified plants in a first manner, and components labeled with "B" are configured to treat plants in a second manner. Thus, selecting which treatment and treatment mechanism to apply to an identified plant may include selecting the corresponding components of the fluidics system 300. That is, selecting an identified plant for growth regulation may include selecting "A" components, while selecting an identified plant for growth promotion may include selecting "B" components. Selection of "A" or "B" components may be easily expanded to other similar use cases. For example, the system may apply a first treatment to a first plant using "A" components, and may also apply a second treatment to the first plant using "B" components (when treatment/plant selection calls for such a treatment. Additionally, "A" components and "B" components may be mutually exclusive due to treatments to be implemented, treatment chemistries, treatment selection logic, etc. This can also apply to spatial implementations of plant. For example, "A" components may be selected rather than "B" components when the farming machine applies treatments to the plant itself, near the plant, near the plant but only touching the leaves, etc.

Turning now to a more detailed description of the fluidics system 300, the reservoir 310 contains treatment fluid and is fluidically coupled to the pump 320. The pump 320 is fluidically coupled to a distribution supply manifold 340 and pumps treatment fluid from the reservoir 310 to the distribution supply manifold 340. As the treatment fluid is pumped from the reservoir 310 to the distribution supply manifold 340, the treatment fluid passes through a front pressure regulator 330 fluidically coupled to the pump 320 and distribution supply manifold 340.

A high dynamic range front pressure regulator 330 can monitor and regulate the pressure of all elements of the fluidic system 300 after the front pressure regulator 330 ("downstream" elements). In some example configurations, the front pressure regulator 330 includes a restricting element, an actuating element, and a sensing element (e.g., sensor 236). The restricting element is an element (e.g., a valve) that can restrict, or increase, the flow of treatment fluid from the pump 320 to the distribution supply manifold 340. The sensing element is a measurement system configured to determine the pressure of the downstream elements (e.g., a sensor diaphragm). Finally, the actuating element (e.g., input controller 234) is an element configured to actuate the restricting element to restrict, or increase, the downstream pressure. To illustrate the combination of the elements, the sensing element determines the downstream pressure, and the actuating element restricts the flow of treatment fluid using the restricting element.

The distribution supply manifold 340 is fluidically coupled to any number of nozzle manifolds 350 (although only one is illustrated). The nozzle manifold 350 is a modular array of valves 352 and nozzles 354 (i.e., treatment mechanisms 120). The distribution supply manifold regulates flow of the treatment fluid to the nozzle manifold 350. The distribution supply manifold 340 can restrict, or increase, the flow of treatment fluid to any number of nozzle manifolds 350. Each nozzle manifold 350 is fluidically coupled to any number of to any number of valve assemblies 352, and each valve assembly 352 is fluidically coupled to any number of nozzles 354 such that at least some portion of the treatment fluid entering the nozzle manifold 350 can flow to (e.g., be sprayed on) plants 104 in the field.

In some cases, not all of the treatment fluid entering a nozzle manifold 350 flows to plants on a field. Accordingly, each nozzle manifold 350 may be fluidically coupled to the distribution return manifold 360 such that the portion of the treatment fluid that did not flow from the nozzle manifold 350 to plants on the field ("unused treatment fluid") can flow to the reservoir. The distribution return manifold 360 aggregates unused treatment fluid returning from the nozzle manifold 350 for return to the reservoir 310. In some examples, the distribution return manifold 360 can restrict, or increase, the flow of treatment fluid from a nozzle manifold 350 to the distribution return manifold 360.

The distribution return manifold 360 is fluidically coupled to the reservoir 310 such that unused treatment fluid can flow into the reservoir 310 for future use by the system 300. As unused treatment fluid flows from the distribution return manifold 360 to the reservoir, the treatment fluid passes through a high dynamic range back pressure regulator 370 fluidically coupled to the distribution return manifold 360 and the reservoir 310. The back pressure regulator 370 can monitor and regulate the pressure of all elements of the pressurization system before the back pressure regulator ("upstream" elements) similarly to the front pressure regulator 330 and downstream elements. That is, the backpressure regulator 330 determines the upstream pressure using a sensing element, and an actuating element restricts the flow of treatment fluid using a restricting element.

In various configurations, the fluidics system 300 can include more or fewer elements. For example, the fluidics system 300 can include only a back pressure regulator 370 for regulating pressure of treatment fluid in the fluidics system 300, or can include only a front pressure regulator for regulating pressure 330 of treatment fluid in the pressurization system 300. In some cases, the fluidics system 300 may not be configured to allow treatment fluid to return to the reservoir 310.

In various example configurations, the nozzles 354 and valves 352 of a nozzle manifold 350 can be variously configured. For instance, the nozzles 354 may be different sizes, shapes, forms, etc., and the nozzles 354 may thereby apply different treatments corresponding to differences between the nozzles. For example, a first nozzle may be configured for wide area spraying while a second nozzle is configured for small area spraying, or a first nozzle may be configured for a large droplet size while a second nozzle may be configured for a small droplet size. Similarly, the valves 352 may be different sizes, shapes, forms, etc., or have different control parameters such that the valves 352 produce different treatments. For example, a first valve may be configured for high flow rate spraying, while a second valve is configured for low flow rate spraying.

In various example configurations, the nozzles 354 and valves 352 of a nozzle manifold 350 may be arrayed in different configurations. As illustrated, the nozzles 354 and valves 352 largely alternate in an "A", "B", "A", "B", manner, but that need not be the case. Any other arrangement of nozzles 354 and valves 352 is also possible. Additionally, there is not necessarily a 1:1 correspondence between nozzles 354 and valves 352. That is, a single nozzle 354 may be controlled by multiple valves 352, or a single valve 352 may control multiple nozzles. This may allow the farming machine 100 to have a single valve 352 configured for both "A" and "B" treatments controlling a nozzle 354 configured for only "A" and a nozzle 354 configured for only "B", or it may allow for the farming machine 100 to have a valve 352 configured for only "A" and a valve 352 configured for only "B" to employ a nozzle 354 configured for both "A" and "B".

Finally, as illustrated, the fluidics system 300 includes "A" and "B" pathways, but the farming machine may be configured for additional pathways. For instance, a farming machine may have 2, 3, 4, 5, or 10 pathways depending on the desired machine form.

V. Treatment Selection System

Figure 4:
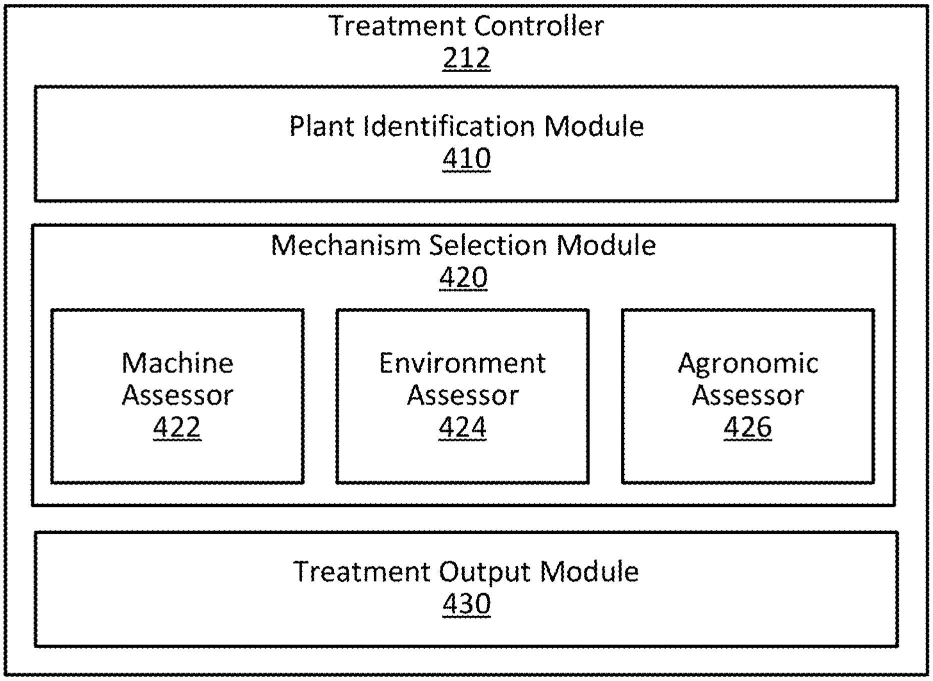
FIG. 4 is a block diagram of a treatment controller of the farming machine, according to one example embodiment.

FIG. 4 is a block diagram of the treatment controller 212 of the farming machine 100, according to one example embodiment. The treatment controller 212 selects treatment mechanisms 120 to employ to treat identified plants (e.g., the plant 104). As described above, selecting a treatment mechanism 120, in effect, selects a "type" of treatment to apply to an identified plant because each treatment mechanism 120 may be differently configured. Selecting a treatment mechanism 120 may include selecting treatment chemistries, treatment locations, treatment characteristics, machine forms, and others. To select one or more treatment mechanisms 120 to treat an identified plant, the treatment controller 212 takes input from a plant identification module 410, a mechanism selection module 420, and a treatment output module 430.

The plant identification module 410 uses machine learning to identify a plant (e.g., the plant 104) within a captured image of a portion of the field 160. The plant identification module 410 trains, and/or previously trained, a machine-learned model to identify plants from images using training data (e.g., images of plants) stored in the datastores 226. The machine-learned model is configured to take in an image including one or more plants and provide, as output, identification and characteristics of the plant. The image may be captured by the detection mechanism 110 of the farming machine 100. Example characteristics include a species, size, location, and treatments corresponding to the plant, a health of the plant, a damage level of the plant (e.g., due to insects, weather, etc.).

The model may be a convolutional neural network trained via supervised or unsupervised machine learning. In some embodiments, other training techniques may be linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on. The trained model, when applied to an image of a plant captured by the detection mechanism 110, identifies the plant.

Figure 5A:
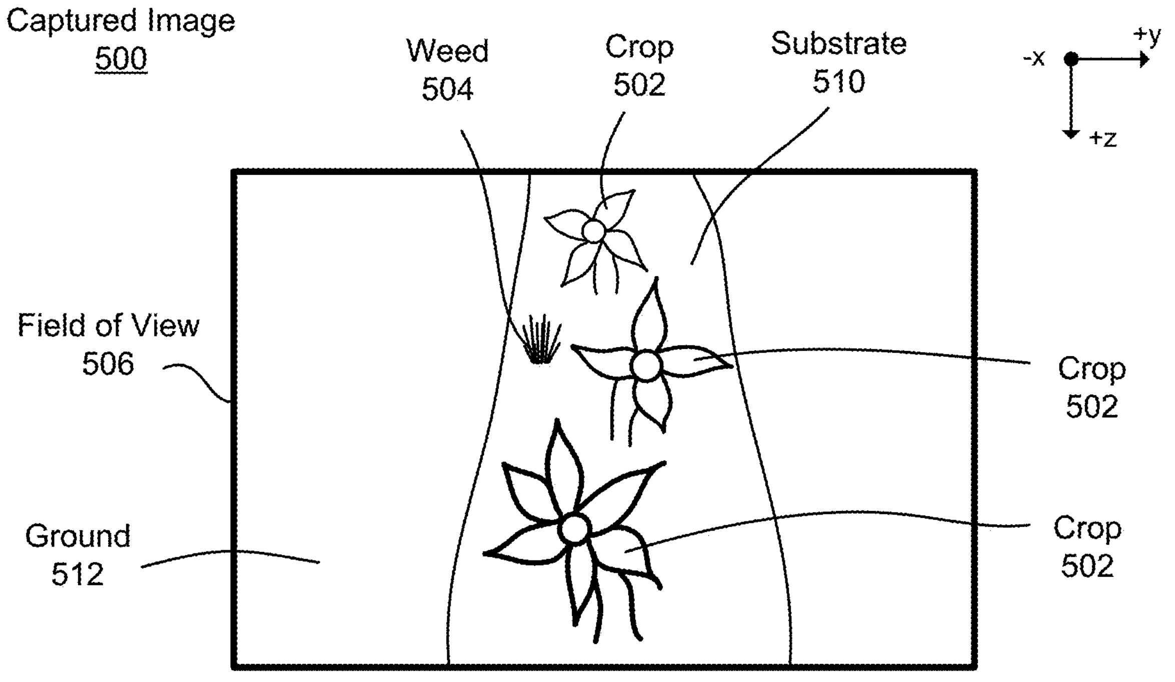
FIG. 5A illustrates a captured image of a field captured by the farming machine, according to one example embodiment.
Figure 5B:
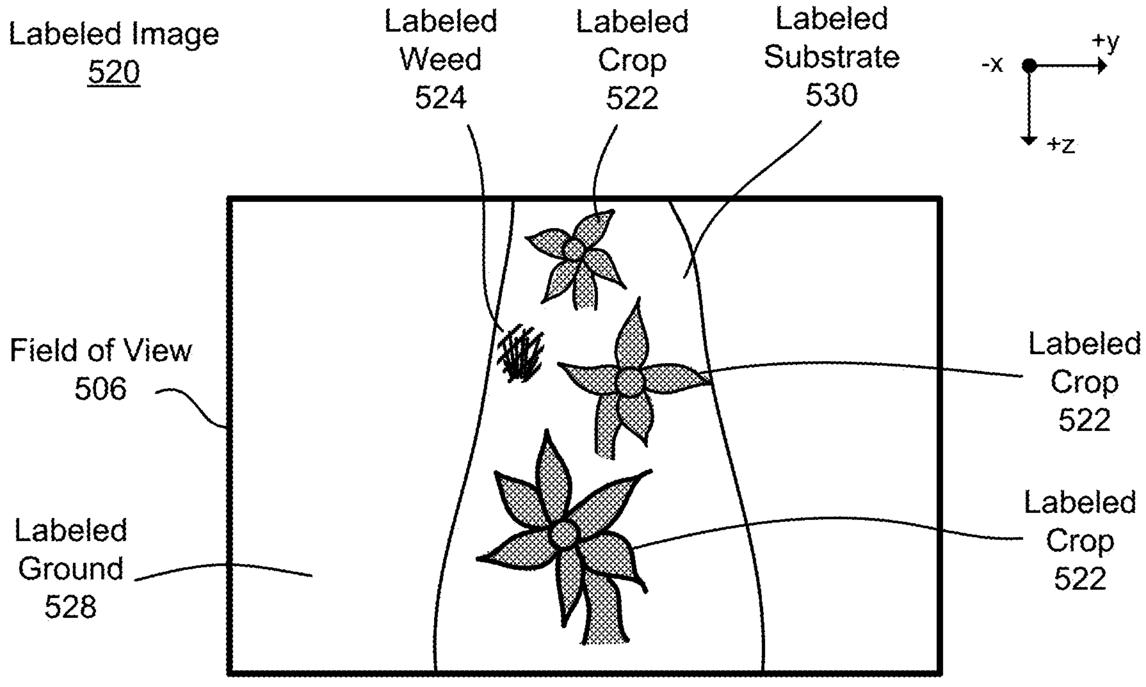
FIG. 5B illustrates a labeled image of the field, according to one example embodiment.

In some embodiments, the model is a semantic segmentation model implanted as a convolutional neural network that outputs a labeled version of the captured image. The output image may include labels of specific species of crops and weeds in the image, for example. The semantic segmentation model may be similar in structure to the model described in U.S. patent application Ser. No. 16/126,842 titled "Semantic Segmentation to Identify and Treat Plants in a Field and Verify the Plant Treatments," filed on Sep. 10, 2018. Notably, the segmentation model described therein may be configured with additional labels as described hereinabove. FIG. 5B depicts an example labeled version of the captured image.

V.A Mechanism Selection Module

The mechanism selection module 420 is configured to select treatment mechanisms to treat the identified plant based on measured results from external systems 220 and the machine component array 230 describing the farming machine 100 and its environment 102. The mechanism selection module includes a machine assessor 422, an environment assessor 424, and an agronomic assessor 426, each of which determines selection conditions relevant for the treatment of an identified plant.

The machine assessor 422 identifies operational states, operational modes, treatment parameters, and treatment characteristics of the farming machine 100.

Operational states describe the various treatment configurations implementable by the farming machine 100. For example, an operational state may be "weeding" in which the farming machine is configured to weed a crop field, or an operational state may be "fertilizing" in which the farming machine is configured to fertilize a crop field. Of course, various other example operational states are also possible.

Operational modes describe the various treatment mechanisms 120 and their characteristics implementable by the current operational state of the farming machine 100. For example, an operational mode may be used to describe the various manners a component may be actuated to treat a plant within an operational state of the farming machine. Moreover, because a farming machine includes different operational states, each component may have different operational modes associated with different operations states. For instance, a first component may have a first operational mode in a first operational state, and that same component may have both a second and a third operational mode in a second operational state, etc. Additionally, operational modes may describe components in various ways. For instance, an operational mode may describe whether the nozzle is operational or non-operational, error conditions of components of the nozzle, a chemical composition of the corresponding treatment, a volume of the corresponding treatment, a flow rate of the corresponding treatment, and so on for each nozzle of the farming machine 100.

Treatment parameters describe physical attributes of the nozzles, including a shape of the nozzle, a position or orientation (e.g., direction of the nozzle, such as forward or downwards) of the nozzle, an angle of the nozzle (e.g., the angle of the nozzle relative to a normal angle, the angle of the nozzle relative to other nozzles, etc.), a diameter of the nozzle, a design of the nozzle, and height of the nozzle relative to the ground, etc.

Treatment characteristics describe the treatment output from the nozzle when actuated and varies based on the operational mode and treatment parameters of the nozzle. For example, treatment characteristics may be a spray pattern, area, spray speed, droplet size, a spray pattern formation time profile of the nozzle, a pressure dependency profile for the nozzle, and density of the treatment once the nozzle is actuated.

Machine Assessor

As described above, the machine assessor 422 can determine operational modes of the farming machine. To do so, the machine assessor 422 accesses a configuration data structure describing the current configuration (or possible configurations) of the farming machine 100. In various examples, the data structure may describe machine forms, treatment areas, treatment characteristics, treatment chemistries, treatment plans, farming actions, etc. In effect, the configuration data structure describes what types of treatment the mechanism selection module 420 can implement to treat an identified plant given the various configuration possibilities of the farming machine 100. The configuration data structure accordingly includes the operational states, operational modes, treatment parameters, and treatment characteristics corresponding to the farming machine 100.

The machine assessor 422 can functionalize the configuration data structure in a variety of manners. For instance, the machine assessor 422 can (1) access a stored configuration data structure of the farming machine 100, (2) receive a data structure from a manager describing the current configuration of the farming machine 100, and/or (3) generate a configuration data structure by querying various components currently installed on the farming machine 100 a determining operational modes, treatment parameters, etc. based on the query. To generate the configuration data structure, the machine assessor 422 accesses components 232 of the machine component array 230 and determines the states of those components using the sensors 236. In some embodiments, the machine assessor 422 also accesses datastores 226 and sensors 222 from external systems 220. For example, the sensors 236 may measure a speed of the farming machine, a position of treatment mechanisms on the farming machine, a distance between the treatment mechanism and the substrate, a variance in treatment mechanism height, an error condition of a component, available operational modes of a component or the farming machine, etc. Measurements of the state may be any appropriate quantification for the corresponding state. For example, the measurement of the height may be in meters, the speed may be in km/hr, the error condition may be "operational" or "not operational," etc.

The machine assessor 422 may select one or more treatment mechanisms 120 to treat an identified plant based on the configuration data structure for the farming machine 100. Specifically, the mechanism selection module 422 may compare the different operational modes, treatment parameters, and treatment characteristics to select the one or more treatment mechanisms 120. For example, for each of the treatment mechanisms 120, the machine assessor 422 may compare typical operational ranges, the farming machine 100's speed, and accuracy of treatment.

Environment Assessor

The environment assessor 424 determines a state of the environment 102 (e.g., an "environment state"). The environment state 102 is a quantification of conditions in the surrounding environment 102 that may be pertinent to selecting treatment mechanisms 120. For example, the state of the environment 102 may include temperature, humidity, air quality, and so on. The environment assessor 424 accesses various components 232 of the machine component array 230 to determine the state of the environment 102. In some embodiments, the environment assessor 424 also accesses datastores 226 and sensors 222 from external systems 220 to determine the environment state. The environment assessor 424 may measure the environment 102 using a component 232, or a sensor 236 of a component 232 of the farming machine 100. For example, a sensor 236 may measure wind speed, lighting conditions, weather conditions, moisture of a substrate, temperature, etc.

The environment assessor 424 may also determine a location of the farming machine 100 in the field 160. The environment assessor 424 may determine the location of the farming machine 100 by referencing a GPS location and/or a relative location of the farming machine 100 in the field 160. The determined location may be related to a map of the field 160 that includes spatial representations of plant locations, weed pressures, previous treatments, soil conditions, etc. Measurements of the environmental conditions state may be any appropriate quantification for the corresponding environmental condition. For example, the measurement of the wind speed may be in km/hr, the lighting conditions may be in lumens, etc.

The environment assessor 424 may use the location information, as well as other information corresponding to the map, to select the treatment mechanisms 120 for the treatment of the identified plant. For instance, if the map indicates that there is a higher weed pressure in the area, the farming machine may select a first treatment (e.g., broadcast spray) rather than a second treatment (e.g., spot-spray). In some embodiments, the mechanism selection module 420 compares output of the machine assessor 422 with that of the environment assessor 424 to select one or more treatment mechanisms 120. For example, the mechanism selection module 420 may compare a measurement of the wind speed to the operational range for a first type of treatment and a second type of treatment employable by the farming machine 100. Based on the comparison, the treatment selection module may implement the first treatment or the second treatment.

Agronomic Assessor

The agronomic assessor 426 determines how agronomic principles of the implemented farming objective, treatment plan, farming actions, etc., are affected by the treatment selection conditions. That is, the agronomic assessor 426 considers agronomic principles such using "broadcast spray" versus "spot spray", or "growth regulator" versus "growth promoter", or "cost efficient" versus "cost inefficient", or "broadleaf weed" versus "grass weed", or "high weed pressure" versus "low weed pressure", or "first chemistry" versus "second chemistry", "subspecies 1" versus "subspecies 2", etc. to treat identified plants in view of the selection principles. In some embodiments, agronomic principles are based on legal maximums (e.g., a legal maximum of fertilizer that may be applied to a crop). In other embodiments, agronomic principles are based on industry recommendations (e.g., a recommended minimum or maximum volume or density of treatment) and/or standard industry practices (e.g., a standard minimum or maximum volume or density of treatment).

Assessments of the agronomic principles are typically built into the treatment controller 212. For instance, the treatment controller 212 may analyze the available operational modes of the farming machine 100 to determine which agronomic principles to apply. For example, if the operational modes indicate a fluidic system with the choice between a growth promoter and a growth regulator, the agronomic assessor 426 will act accordingly. In some circumstances, the treatment controller 212 may receive input from a manager that affects agronomic principles to apply in agronomic assessments. For example, a manager may indicate a farming objective for a field (e.g., high speed over high accuracy) and the agronomic assessor 426 will act accordingly (e.g., broadcast spray over spot spray). Still in other examples, the treatment controller may employ a computer model (e.g., a convolutional neural network) trained to implement agronomic principles when selecting treatment mechanisms.

On par, the mechanism selection module 420 uses the data collected by the machine assessor 422, the environment assessor 424, and the agronomic assessor 426 to select two or more treatment mechanisms 120 for the identified plant. The mechanism selection module 420 receives the identification and characteristics of the plant from the plant identification module 410 and determines an appropriate treatment for the identified plant (given the various measurements, data structures, and readings from the machine assessor 422, environment assessor 424, and agronomic assessor 426). The determined treatment includes a treatment type, area, and treatment density for the identified plant. For example, the mechanism selection module 420 may determine that the identified plant is a crop that needs fertilizer, applied with a density of, for example, 30-200 lbs/acres across a 10 $ft^2$ area.

V.B Selecting Mechanisms

Using information collected by the machine assessor 422 (and/or the environment assessor 424, and/or the agronomic assessor 426), the mechanism selection module 420 identifies the treatment mechanisms 120 available within the farming machine 100. The mechanism selection module 420 identifies combinations of the treatment mechanisms 120 and for each combination, a combined treatment area and combined treatment density. The mechanism selection module 420 then determines which combination produces a combined treatment area and density that is similar, within a threshold accuracy, to the determined treatment for the identified plant.

The mechanism selection module 420 may use a machine-learned model (e.g., a mechanism selection model) to select the best combination of treatment mechanisms 120. The machine-learned model may identify combinations of treatment mechanisms 120 that will treat the identified plant with a level of accuracy above a threshold. Different treatment characteristics may correspond to different threshold values. For example, the machine-learned model may determine that the combined treatment density of two or more treatment mechanisms 120 must be within ±10% of the determined treatment density, and that the combined treatment area must be within ±5% of the determined treatment area. The machine-learned model may be part of the plant identification model trained by the plant identification module 410. In other embodiments, the machine-learned model is different from that trained by the plant identification module 410.

In some embodiments, mechanism selection module 420 also performs a cost savings analysis in selecting the best combination of treatment mechanisms 120. To do so, the machine-learned model that may take, as input, a cost associated with each of the treatment mechanisms 120 and outputs a combination of treatment mechanisms based on the cost savings. The cost savings may depend on the operational state, treatment parameters, and treatment characteristics associated with the treatment mechanism 120. For example, the machine-learned model may determine that a particular treatment mechanism has been used extensively over time, such that it would require repairs and/or operate inefficiently such that it would increase costs if it were selected.

The machine-learned model may be a convolutional neural network trained via supervised or unsupervised machine learning. In some embodiments, other training techniques may be linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

Additionally, all of the functionality attributed to the machine-learned model guiding selection of mechanisms by the mechanism selection module 420 may be implemented by an operator or operator designed logic. That is, an operator may define a particular set of inputs that would generate a particular type of output.

The treatment output module 430 is configured to generate machine instructions to actuate treatment using the selected combination of treatment mechanisms 120. The mechanism selection module 420 selects the combination of the treatment mechanisms 120 to apply to the identified plant, and the treatment output module 430 generates machine instructions to implement the selected treatment mechanisms 120.

VI. Example Captured Image of Plants

As described above, the farming machine 100 uses a detection mechanism 110 to capture an array of pixels representing visual information of the environment 102. FIG. 5A illustrates a captured image 500 of the field (e.g., field 160) captured by the farming machine 100, according to one example embodiment. The captured image 500 includes various plants and the ground 512 within a field of view 506; the plants include multiple crops 502, and a weed 504 growing on a substrate 510. In some embodiments, the captured image 500 also includes visual information representing one or more machine components of the farming machine 100, the sky, persons, obstacles, animals, or any other objects pertinent to the environment 102.

FIG. 5B illustrates a labeled image 520 of the field. The farming machine 100 generates the labeled image 520 using the treatment controller 212. The labeled image 520 is an image whose visual information (e.g., one or more pixels in the captured image 500) is labeled corresponding to the real world object(s) it represents. For example, the labeled image 520 includes labeled crops 522, a labeled weed 524, the labeled ground 528, and the labeled substrate 530, corresponding to pixels associated with the crops 502, the weed 504, the ground 512, and the substrate 510, respectively. The visual information labeled as the weed 524 has a first fill pattern, and the visual information labeled as a crop 522 has a second fill pattern. For clarity, the visual information labeled as substrate 530 and ground remain unfilled 528. Additionally, the labeled visual information is overlaid on the captured image, though it need not be.

In some examples, the labeled image 520 labels different plant species as per the output of the plant identification module 410. For example, the plant identification module 410 may be configured to identify and label both soybean crops and corn crops in the same or different images, but other example crop differentiations are also possible. Similarly, the treatment controller 212 may be configured to identify and label broadleaf weeds and grass weeds in the same or different images, but other example weed differentiations are also possible. Still further, the plant identification module 410 may be configured to identify between subspecies of plants. For instance, the treatment controller 212 may be configured to identify both milkweed and thistle in the same or different images, but other example subspecies differentiations are also possible. The treatment controller 212 may identify and differentiate between plant species using a model similar to the model described in U.S. patent application Ser. No. 16/995,618, titled "Plant Group Identification," filed on Aug. 17, 2020. The model described therein may be configured with additional labels as described hereinabove.

VII. Example Application of Selected Treatment Mechanisms

Figure 6A:
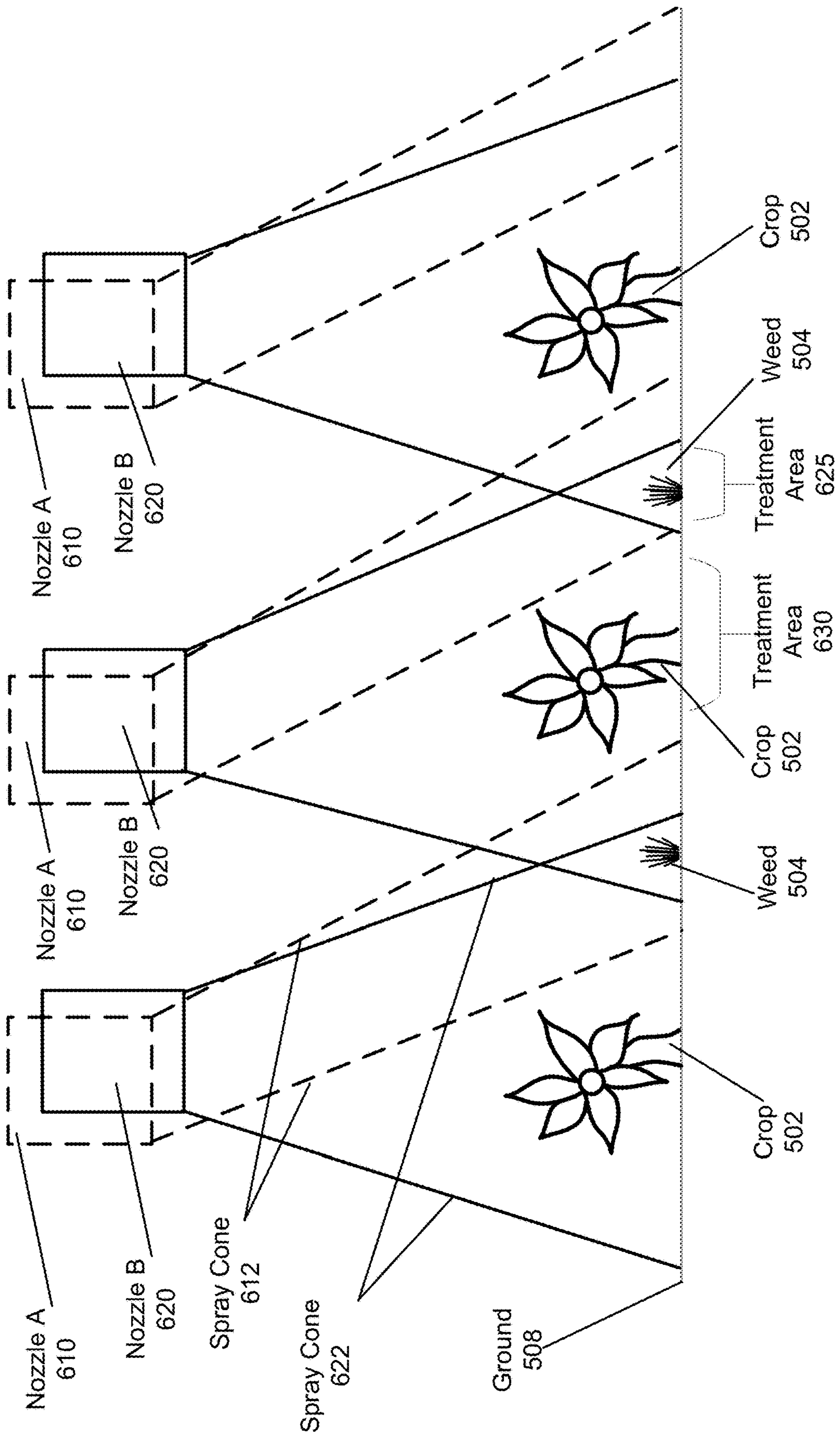
FIG. 6A illustrates a cross sectional view of plants in the field being treated by the farming machine, according to one example embodiment.

FIG. 6A illustrates a cross sectional view of plants in the field 160 being treated by the farming machine 100, according to one example embodiment. FIG. 6A shows two treatment mechanisms 120—a nozzle A 610 and a nozzle B 620—treating the crops 502 and multiple weeds 504, growing out of the ground 508.

In this example, the farming machine 100 is configured to treat the weeds 504. The farming machine 100 captures an image of a portion of the field 160 (e.g., the captured image 500), including at least one of the crops 502 and at least one of the weeds 504. The treatment controller 212 identifies and determines an appropriate treatment for each plant. For example, to treat the weeds 504, the treatment controller 212 may determine that an herbicide treatment of a certain density and volume across a treatment area 625 is appropriate.

The treatment controller 212 applies a machine-learned model to determine that the combination of nozzle A 610 and nozzle B 620 will treat the weeds 504 with the determined herbicide treatment. When combined, nozzle A 610 and nozzle B 620 spray each weed 504 across a combined treatment area with a combined treatment density. The combined treatment area and density may be within a threshold level of accuracy of the determined treatment. In FIG. 6A, the sprays of both nozzle A 610 and nozzle B 620, when combined, treat the weed 504 in the treatment area 625.

In some embodiments, the treatment controller 212 identifies plants adjacent to the identified plant and determines how the adjacent plant will respond to the treatment. If the treatment has a harmful effect on the adjacent plant and if the selected combined treatment mechanisms 120 will treat an area covering the adjacent plant, the treatment controller 212 may select a different type of treatment or different combination of treatment mechanisms 120. In FIG. 6A, for example, the crops 502 are located adjacent to each of the weeds 504. The treatment controller 212 may identify the crops 502 and determine that the application of herbicide at the determined treatment volume and density would harm the crops 502. The treatment controller 212 may subsequently adjust the output of nozzle B 620 or select a different nozzle to ensure that the crops 502 are not negatively affected by the treatment. For example, in FIG. 6A, nozzle B 620's output covers a treatment area 635, within which the crop 502 is located. Nozzle B 620 may output a volume and density of herbicide that does not significantly affect the crop 502. The combination of treatment from nozzle A 610 and nozzle B 620, however, may be harmful to the crop 502, but necessary to treat the weed 504.

Figure 6B:
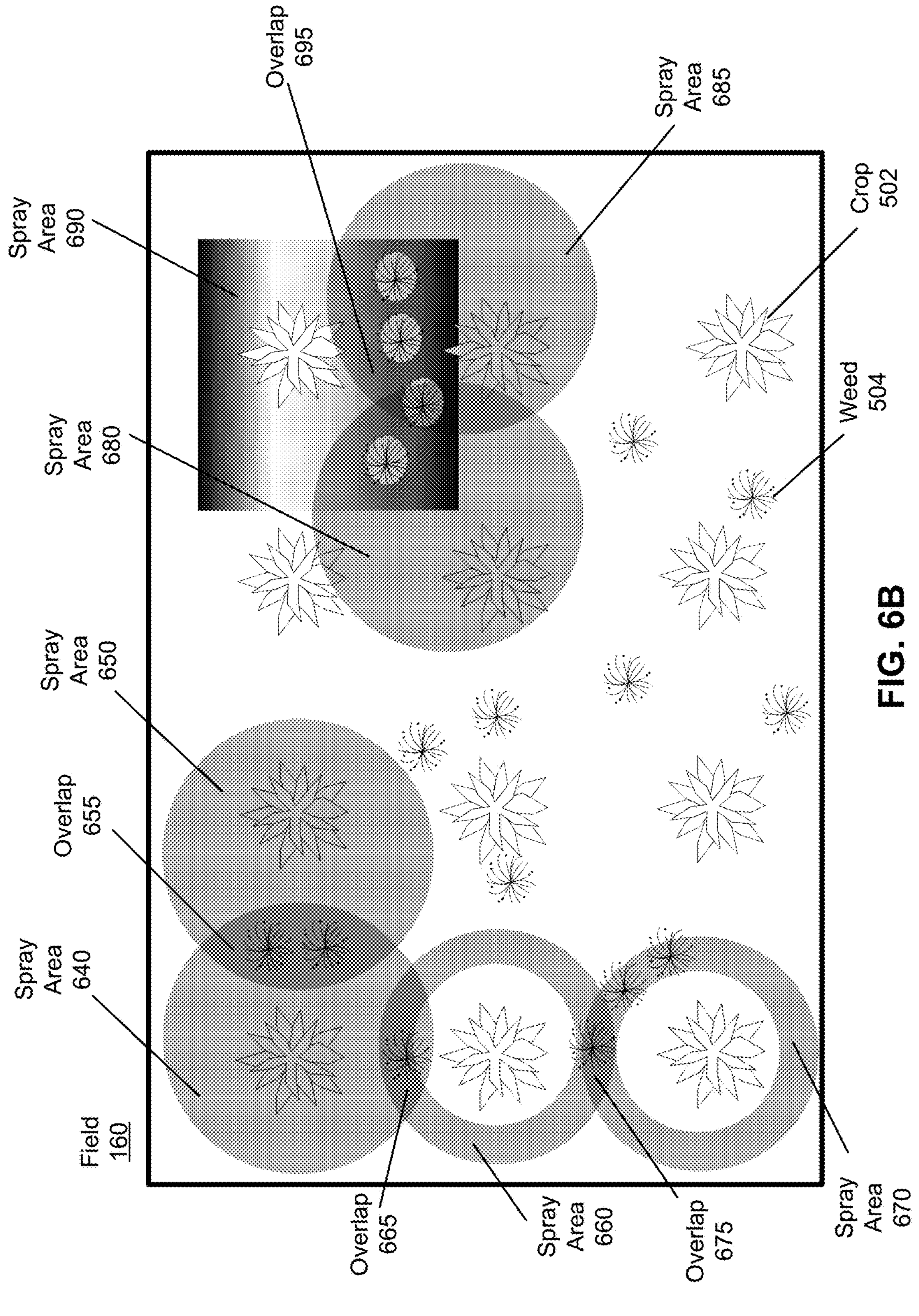
FIG. 6B illustrates an aerial view of plants in the field being treated by the farming machine, according to one example embodiment.

FIG. 6B illustrates an aerial view of plants in the field 160 being treated by the farming machine 100, according to one example embodiment. The aerial view includes a number of spray areas and overlaps. Each spray area represents a treatment area of a treatment mechanism 120 (e.g., the nozzle A 610) of the farming machine 100. The shape, size, and diameter of a spray area depends on treatment parameters, such as, e.g., nozzle shape and spray pattern. For example, a hollow cone nozzle may produce spray areas 660 and 670. A full cone nozzle may produce spray areas 650, 650, 680, and 685. A nozzle with an uneven spray pattern may produce the gradient seen in spray area 690. Each overlap area represents a combined treatment area of two or more treatment mechanisms 120. In FIG. 6B, overlap areas 655, 665, 675, and 695 show that the combined treatment mechanisms 120 of the farming machine 100 are used to target the weeds 504, while leaving the crops 502 unaffected by the treatment.

VIII. Workflows for Selecting a Treatment Mechanism

VIII.A Example Workflow for Selecting a Treatment Mechanisms

Figure 7A:
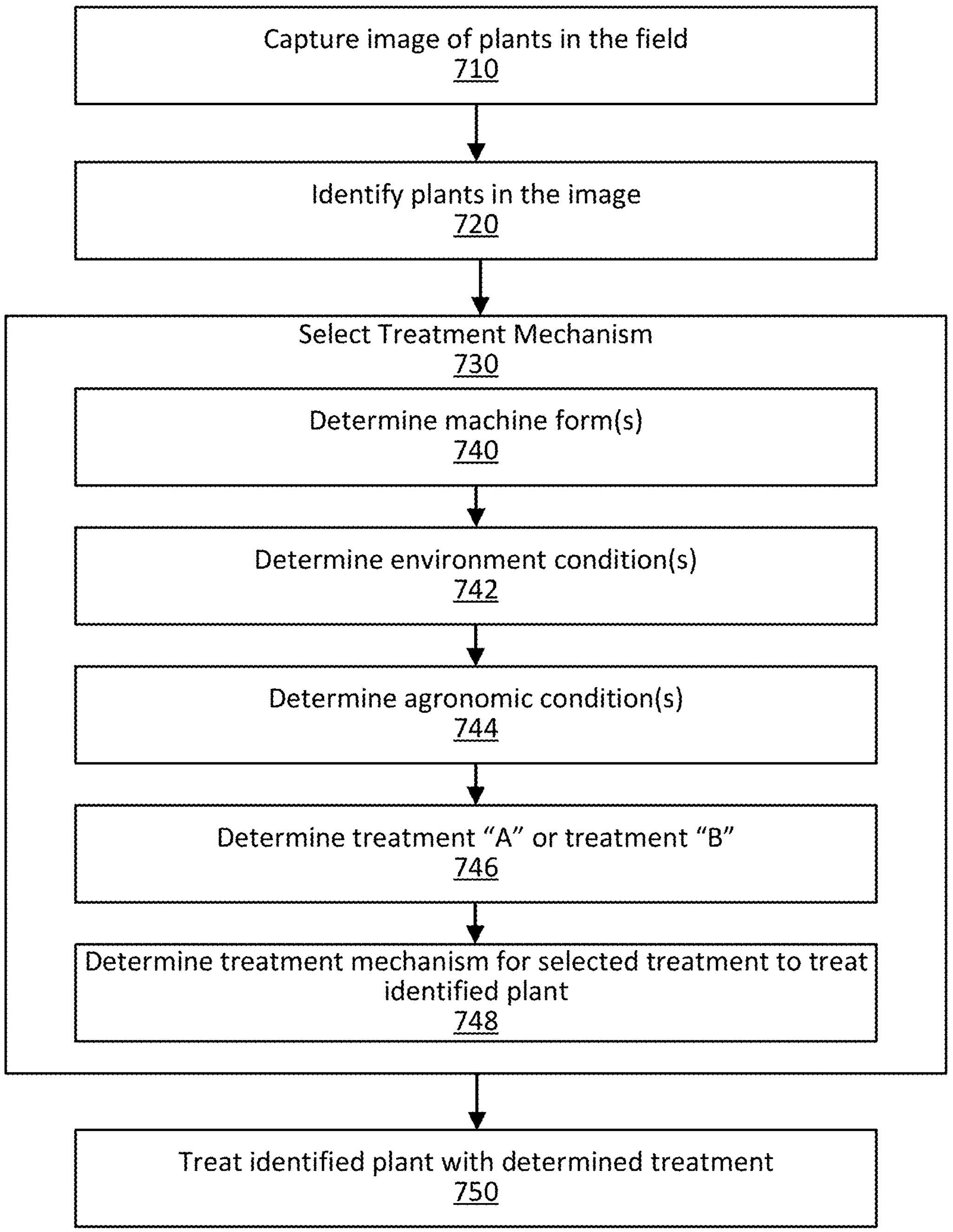
FIG. 7A-B illustrate example methods for selecting treatments for an identified plant in the field, according to example embodiments.

FIG. 7A illustrates an example method for selecting a treatment for an identified plant in a field, according to one example embodiment. The workflow 700 of the method is just an example. In various configurations, the workflow may include additional or fewer steps, or the steps may occur in a different order.

Within the workflow 700A, a farming machine (e.g., the farming machine 100) is configured to treat plants with treatment mechanisms as it travels through a field (e.g., the field 160). The farming machine is configured with a first operational state and a second operational state. The first operational state allows the farming machine to implement a first treatment with a first treatment mechanism, and the second operational state allows the farming machine to implement a second treatment with a second treatment mechanism. The farming machine employs a treatment controller (e.g., the treatment controller 212) for identifying plants in captured images, selecting treatments, and implementing those treatments.

The farming machine captures 710 an image of plants in the field. That is, a detection mechanism (e.g., the detection mechanism 110) of a farming machine captures an image comprising a plurality of pixels (e.g., the captured image 500). The plurality of pixels comprises latent information representing plants, the ground, the sky, etc. Moreover, the latent information also includes information indicating a type of each plant in the image. The first operational state is configured to treat plants of a first type, and the second operational state is configured to treat plants of a second type.

The farming machine identifies 720 the plants in the image. That is, the treatment controller applies a plant identification module (e.g., the plant identification module 410) to the image to label the plants and their corresponding types in the image. Here, the farming machine identifies the second type of plant in the image.

The farming machine selects 730 a treatment mechanism (e.g., the treatment mechanism 120) using a mechanism selection module (e.g., the mechanism selection module 420) of the treatment controller.

The mechanism selection module determines 740 a form of the farming machine by employing a machine assessor (e.g., the machine assessor 422). The machine assessor accesses a configuration data structure of the farming machine to determine the configuration of treatment mechanisms on the farming machine (e.g., the position, operability, and error state of a treatment mechanism).

The mechanism selection module determines 742 environmental conditions by employing an environment assessor (e.g., the environment assessor 424). The environmental state defines the farming machine is operating in nominal treatment conditions for the current configuration of the farming machine.

The mechanism selection module determines 744 agronomic conditions by employing an agronomic assessor (e.g., the agronomic assessor 426). The mechanism selection module factors in agronomic principles of the current configuration of the farming machine and environmental conditions. For instance, the agronomic assessor determines that the farming machine is configured to treat a first type of plant and a second type of plant.

The farming machine employs the mechanism selection module to determine 746 the treatment for the identified plant. As described above, in this example, the plant identification module identified a plant of the second type in the image, the mechanism selection module determines that the farming machine will apply the second treatment to the second type of plant.

The farming machine employs the mechanism selection module to determine 748 the appropriate treatment mechanism(s) to apply the second treatment to the identified plant of the second type. In some embodiments, to determine the appropriate treatment mechanism(s) for the identified plant, the mechanism selection module uses a machine-learned model that takes, as input, the configuration data structure accessed by the machine assessor, environment conditions, a location of the second plant in the image, or some combination thereof. For example, the mechanism selection module may select a nozzle (e.g., the nozzle A 610) appropriate for treating the second plant based on its location in the image and the current configuration of the farming machine determined by the machine assessor. In another example, the mechanism selection module may determine characteristics for the treatment (e.g., timing, fluid amount) based on the environment conditions and current machine configuration. In some embodiments, the mechanism selection module selects treatment based on a combination of the The farming machine generates 750 the determined treatment with the selected treatment mechanism. That is, a treatment output module (e.g., the treatment output module 430) generates the machine commands to treat the identified second plant using the second treatment mechanism in the second operational mode.

VIII.B Example Workflow for Selecting Two or More Treatment Mechanisms

Figure 7B:
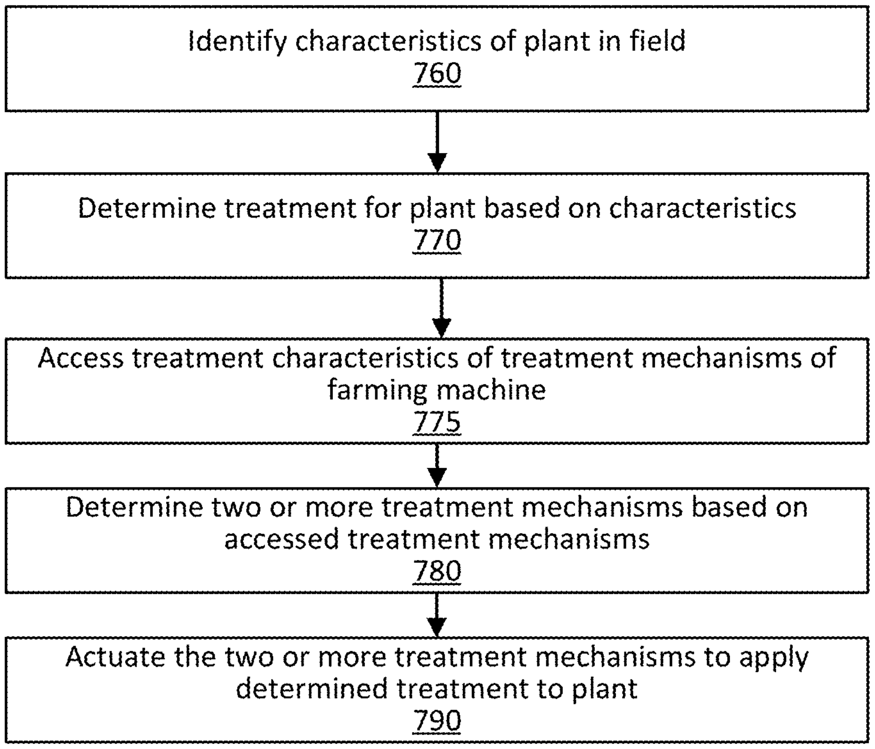

As described above, the farming machine may combine the operational states and/or operational modes to treat an identified plant. As such, the farming machine may select two or more treatment mechanisms to treat the identified plant. FIG. 7B illustrates an example method for selecting a treatment for an identified plant in a field, according to one example embodiment. The workflow 700B of the method is just an example. In various configurations, the workflow may include additional or fewer steps, or the steps may occur in a different order.

Within the workflow 700B, the farming machine is configured to treat plants with treatment mechanisms as it travels through a field. The farming machine is configured with a variety of operational states and operational modes. The different combinations of operational modes and operation states allow the farming machine to provide a wide range of treatments, each treatment with different treatment characteristics.

The farming machine employs a treatment controller for identifying plants in captured images, selecting treatments, and implementing those treatments. Selecting and implementing the treatments includes selecting and actuating two or more treatment mechanisms to provide the selected treatment to the identified plant.

To do so, the farming machine identifies the plant from an image of the field captured by a detection mechanism of the farming machine (e.g., similar to step 720 in workflow 700A).

The farming machine identifies 760 characteristics of the identified plant, including its genus and species, size, location, and so on.

The farming machine determines 770 a treatment for the identified plant based on the identified characteristics. The determined treatment includes a type of the treatment (e.g., pesticide, herbicide, fertilizer, etc.), a treatment density, a treatment area, a treatment volume, and so on.

The farming machine accesses 775 treatment characteristics of its treatment mechanisms. For example, the treatment controller of the farming machine may access a configuration data structure to determine the state of the farming machine. The configuration data structure includes, for every treatment mechanism of the farming machine, operational modes, treatment parameters, and treatment characteristics. In analyzing the configuration data structure, the farming machine determines a pattern and density corresponding to each treatment mechanism for the various possible operational modes, states, treatment parameters, and treatment characteristics.

The farming machine determines 780 two or more treatment mechanisms based on the accessed characteristics of the treatment mechanisms. Based on the configuration of the farming machine provided by the configuration data structure, the treatment controller identifies a combination of treatment mechanisms that match the determined treatment of the plant. Matching quantifies the appropriateness of the treatment for the identified plant based on a variety of factors including, efficiency, cost, suitability (e.g., is it possible, produces the appropriate effects), etc. In effect, the treatment characteristics of the selected combination is similar to, to a level of accuracy, the determined treatment for the plant. For example, the treatment controller may select two nozzles that, in combination, have a combined treatment area (or flow rate, etc.) and density comparable to the determined treatment of the identified plant. In some embodiments, the treatment controller uses a machine-learned model to select the two or more treatment mechanisms.

The farming machine actuates 790 the two or more treatment mechanisms to apply the treatment to the plant.

In some examples, method 700 may be used to determine treatments for multiple identified plants rather than just one. In these cases, the farming machine may determine two or more treatments based on characteristics for the multiple identified plants, adverse effects of the various treatments on each plant, optimization of an area treatment (rather than for a single plant), etc.

VIII.C Example Use Cases

As described above, in some embodiments, the farming machine is configured with, for example, a first operational state and a second operational state (although more operational states are possible). The first operational state allows the farming machine to implement a first treatment with a first treatment mechanism, and the second operational state allows the farming machine to implement a second treatment with a second treatment mechanism. Each operational state allows the farming machine to implement a treatment with a plurality of treatment mechanisms. The operational states may be associated with specific selection conditions for selecting a treatment mechanism and corresponding treatment.

In the example following use cases, the farming machine may select some combination of treatment mechanisms in the first and/or second operational state to treat an identified plant. That is the farming machine may select either the first or the second operational state to treat and identified plant, or may select both the first and the second operational state that, in combination, treat the identified plant.

Boom Height

The farming machine may implement a first treatment using a first treatment mechanism when the boom height is above a threshold value (e.g., the first operational state), and may implement a second treatment using a second treatment mechanism when the boom height is below a threshold value (e.g., the second operational state).

Boom Motion

The farming machine may implement a first treatment using a first treatment mechanism when the boom motion is above a threshold value (e.g., the first operational state), and may implement a second treatment using a second treatment mechanism when the boom motion is below a threshold value (e.g., the second operational state).

Speed

The farming machine may implement a first treatment using a first treatment mechanism when the speed of the farming machine is above a threshold value (e.g., the first operational state), and may implement a second treatment using a second treatment mechanism when the speed of the farming machine is below a threshold value (e.g., the second operational state).

Treatment Chemistry

The farming machine may implement a first treatment using a first treatment mechanism when the identified plant indicates a first chemistry (e.g., the first operational state), and may implement a second treatment using a second treatment mechanism when identified plant indicates a second chemistry (e.g., the second operational state).

Plant Species/Sub-Species

The farming machine may implement a first treatment using a first treatment mechanism when the identified plant is a first species/sub-species (e.g., the first operational state), and may implement a second treatment using a second treatment mechanism when identified plant is a second species/sub-species (e.g., the second operational state).

Wind Speed

The farming machine may implement a first treatment using a first treatment mechanism when the wind speed in the environment is above a threshold value (e.g., the first operational state), and may implement a second treatment using a second treatment mechanism when the speed of the farming machine is below a threshold value (e.g., the second operational state).

Machine Error States

The farming machine may implement a first treatment using a first treatment mechanism when the machine state indicates a first error state or lack of error state (e.g., the first operational state), and may implement a second treatment using a second treatment mechanism when the machine state indicates a second error state or lack of error state (e.g., the second operational state).

Lighting

The farming machine may implement a first treatment using a first treatment mechanism when the environment state indicates a first lighting condition (e.g., the first operational state), and may implement a second treatment using a second treatment mechanism when the machine state indicates a first lighting condition (e.g., the second operational state).

IX. Control System

Figure 8:
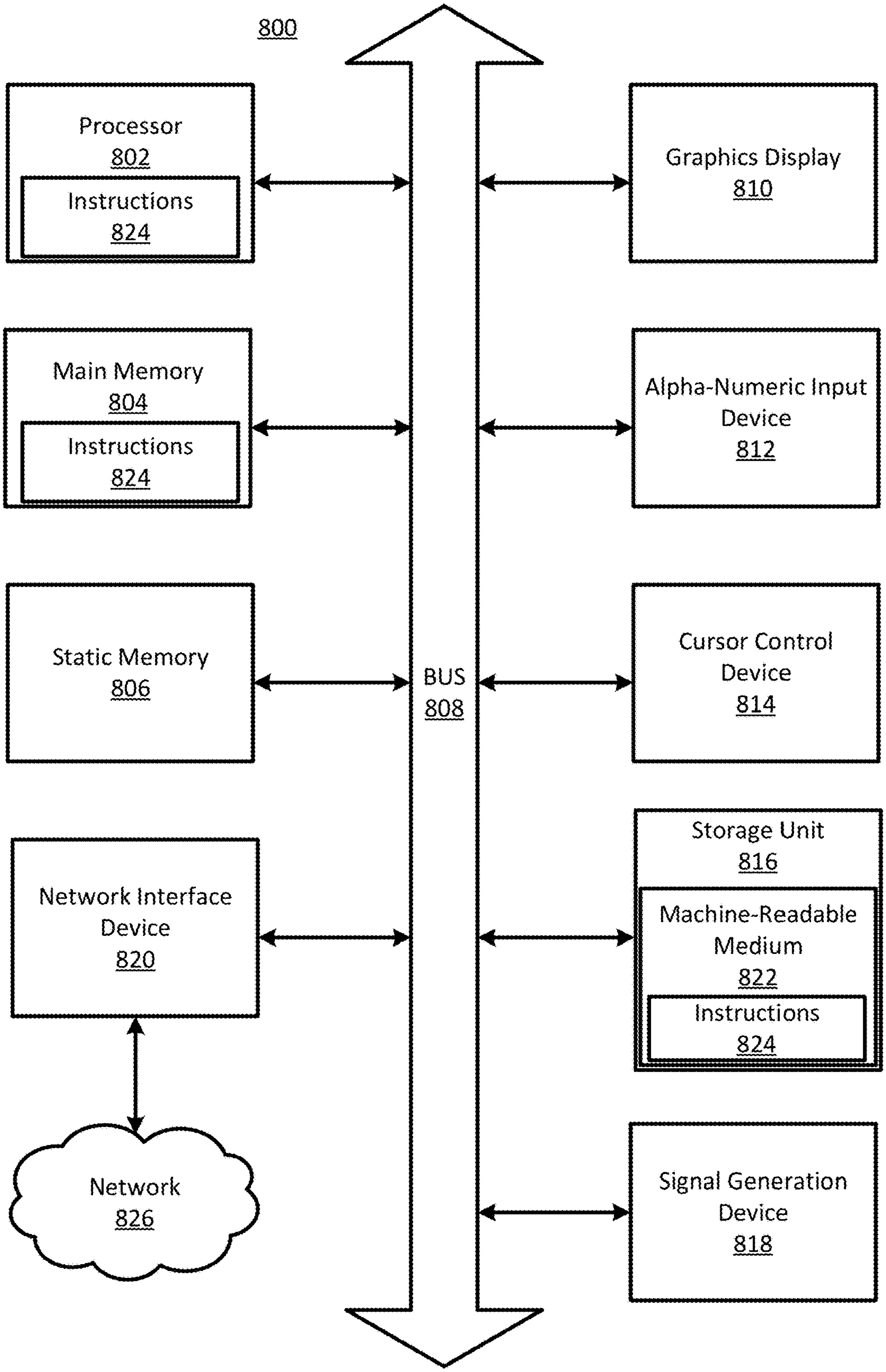
FIG. 8 is a block diagram illustrating components of an example machine for reading and executing instructions from a machine-readable medium, according to one example embodiment.

FIG. 8 is a block diagram illustrating components of an example machine for reading and executing instructions from a machine-readable medium. Specifically, FIG. 5 shows a diagrammatic representation of control system 130 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIG. 2. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 250) via the network interface device 820.

X. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for a farming machine comprising a plurality of treatment mechanisms to treat a plant of a plurality of plants in a field, the method comprising:

identifying characteristics of the plant in the field using an image of the plant captured by a detection mechanism of the farming machine;

determining, based on the identified characteristics, a treatment for the plant comprising a treatment area and a treatment density;

accessing treatment characteristics for each treatment mechanism of the plurality, the treatment characteristics describing a mechanism pattern and a mechanism density for each treatment mechanism when treating the plurality of plants;

determining, based on the accessed treatment characteristics, two or more treatment mechanisms that, in combination, apply the determined treatment to the plant, the determination applying a machine learning algorithm that:

identifies, from the plurality of treatment mechanisms, a plurality of combinations of treatment mechanisms, with each combination comprising two or more treatment mechanisms of the plurality, and determines, based on the plurality of combinations and the treatment characteristics for each treatment mechanism, the two or more treatment mechanisms for treating the plant, wherein the determined two or more treatment mechanisms have a combined treatment area and a combined treatment density different from the determined treatment area and the determined treatment density by less than a threshold amount, and actuating the two or more treatment mechanisms to apply the determined treatment to the plant.

2. The method of claim 1, wherein determining the two or more treatment mechanisms further comprises applying a cost savings analysis to the plurality of combinations of two or more treatment mechanisms.

3. The method of claim 1, wherein determining the two or more treatment mechanisms further comprises identifying a first mechanism pattern and a second mechanism pattern that, in combination, apply the determined treatment with the determined treatment density.

4. The method of claim 1, wherein determining the two or more treatment mechanisms further comprises identifying a first mechanism pattern and a second mechanism pattern that, in combination, apply the determined treatment with a treatment pattern covering the determined treatment area.

5. The method of claim 4, wherein determining the two or more treatment mechanisms further comprises:

identifying a plant adjacent to the plant in the field;

determining an effect of the treatment on the adjacent plant; and responsive to determining that the treatment pattern affects the adjacent plant, determining two or more new treatment mechanisms of the plurality to apply the determined treatment to the plant.

6. The method of claim 1, wherein accessing the treatment characteristics for each treatment mechanism comprises identifying parameters of a nozzle for each treatment mechanism, the parameters comprising one or more of:

a shape of the nozzle;

a position of the nozzle;

an angle of the nozzle;

a diameter of a spray of the nozzle;

a spray pattern formation time of the nozzle;

a pressure dependency profile for the nozzle;

a droplet size of the nozzle; and regulatory controls for the nozzle.

7. The method of claim 1, wherein identifying the characteristics of the plant comprises identifying one or more of:

a species of the plant;

a size of the plant;

a health of the plant;

a damage level of the plant;

a location of the plant; and a set of treatments corresponding to the plant.

8. The method of claim 1, wherein identifying the characteristics of the plant comprises identifying one or more of:

a first agronomic condition of promoting growth or regulating growth of the plant;

a second agronomic condition of a treatment broadcast or a treatment spot spray for the plant; and a set of environmental conditions of the plant.

9. A farming machine comprising:

a plurality of treatment mechanisms configured to treat a plant of a plurality of plants in a field;

a detection mechanism configured to capture images of the plurality of plants in the field; and a non-transitory computer readable storage medium storing computer program instructions that, when executed by one or more processors, cause the one or more processors to:

identify characteristics of the plant in the field using an image of the plant captured by the detection mechanism;

determine, based on the identified characteristics, a treatment for the plant comprising a treatment area and a treatment density;

access treatment characteristics for each treatment mechanism of the plurality, the treatment characteristics describing a mechanism pattern and a mechanism density for each treatment mechanism when treating the plurality of plants;

determine, based on the accessed treatment characteristics, two or more treatment mechanisms that, in combination, apply the determined treatment to the plant, the determination applying a machine learning algorithm that;

identifies, from the plurality of treatment mechanisms, a plurality of combinations of treatment mechanisms, with each combination comprising two or more treatment mechanisms of the plurality, determines, based on the plurality of combinations and the treatment characteristics for each treatment mechanism, the two or more treatment mechanisms for treating the plant, wherein the determined two or more treatment mechanisms have a combined treatment area and a combined treatment density different from the determined treatment area and the determined treatment density by less than a threshold amount; and actuate the two or more treatment mechanisms to apply the determined treatment to the plant.

10. The farming machine of claim 9, wherein executing the computer program instructions for determining the two or more treatment mechanisms further cause the one or more processors to use a machine-learned model configured to determine the combination of the two or more treatment mechanisms that apply the determined treatment to the plant with a level of accuracy above a threshold.

11. The farming machine of claim 9, wherein executing the computer program instructions for determining the two or more treatment mechanisms further cause the one or more processors to apply a cost savings analysis to the plurality of combinations of two or more treatment mechanisms.

12. The farming machine of claim 9, wherein executing the computer program instructions for determining the two or more treatment mechanisms further cause the one or more processors to identify a first mechanism pattern and a second mechanism pattern that, in combination, apply the determined treatment with the determined treatment density.

13. The farming machine of claim 9, wherein executing the computer program instructions for determining the two or more treatment mechanisms further cause the one or more processors to identify a first mechanism pattern and a second mechanism pattern that, in combination, apply the determined treatment with a treatment pattern covering the determined treatment area.

14. The farming machine of claim 13, wherein executing the computer program instructions for determining the two or more treatment mechanisms further cause the one or more processors to:

identify a plant adjacent to the plant in the field;

determine an effect of the treatment on the adjacent plant; and responsive to determining that the treatment pattern affects the adjacent plant, determining two or more new treatment mechanisms of the plurality to apply the determined treatment to the plant.

15. The farming machine of claim 9, wherein executing the computer program instructions for accessing the treatment characteristics for each treatment mechanism further causes the one or more processors to identify parameters of a nozzle for each treatment mechanism, the parameters comprising one or more of:

a shape of the nozzle;
a position of the nozzle;
an angle of the nozzle;
a diameter of a spray of the nozzle;
a spray pattern formation time of the nozzle;
a pressure dependency profile for the nozzle;
a droplet size of the nozzle; and
regulatory controls for the nozzle.

16. The farming machine of claim 9, wherein executing the computer program instructions for identifying the characteristics of the plant further causes the one or more processors to identify one or more of:

a species of the plant;
a size of the plant; a health of the plant; a damage level of the plant; a location of the plant; and
a set of treatments corresponding to the plant.

17. The farming machine of claim 9, wherein executing the computer program instructions for identifying the characteristics of the plant further causes the one or more processors to identify one or more of:

a first agronomic condition of promoting growth or regulating growth of the plant;
a second agronomic condition of a treatment broadcast or a treatment spot spray for the plant; and
a set of environmental conditions of the plant.

* * * * *